United States Patent [19]

Howard

[11] Patent Number: 5,827,032
[45] Date of Patent: Oct. 27, 1998

[54] WEATHERPROOF FASTENING ASSEMBLY

[76] Inventor: James R. Howard, 4300 Dover Ave., Independence, Mo. 64055

[21] Appl. No.: 906,458

[22] Filed: Aug. 5, 1997

[51] Int. Cl.[6] .............................. F16B 15/02; F16B 19/00; F16B 33/00
[52] U.S. Cl. ..................... 411/480; 411/377; 411/903; 411/907
[58] Field of Search ........................ 411/372, 373, 411/377, 480, 903, 907, 908, 431, 482

[56] References Cited

U.S. PATENT DOCUMENTS

| | | | |
|---|---|---|---|
| 370,614 | 9/1887 | Finch | 411/480 |
| 563,969 | 7/1896 | Kempshall | 411/377 |
| 1,620,193 | 3/1927 | Coates | 411/377 |
| 3,396,434 | 8/1968 | Overhoff | 411/377 X |
| 4,557,654 | 12/1985 | Masuda et al. | 411/907 X |
| 4,632,616 | 12/1986 | Sidoti | 411/480 |

*Primary Examiner*—Neill R. Wilson
*Attorney, Agent, or Firm*—Hovey, Williams, Timmons & Collins

[57] ABSTRACT

A fastening assembly (10) that is weatherproof and that does not detract from the appearance of the object (16) into which it is driven is disclosed. The fastening assembly includes a fastening device (12) such as a nail that includes an elongated shank (18) and a head (20) on one end of the shank, and a cover (14) formed of water-tight material that can be positioned over the head of the fastening device for sealing the head from water, air, sunlight, and contaminates. This prevents the head of the fastening device from rusting when the fastening device is driven into an object. The cover can be colored the same color as the object that it is driven into so that it blends in with the object and does not detract the appearance of the object.

6 Claims, 1 Drawing Sheet

WEATHERPROOF FASTENING ASSEMBLY

BACKGROUND OF THE INVENTION

1. Field of the Invention

The present invention relates to nails and other fastening devices. More particularly, the invention relates to a weatherproof cover that can be placed over the head end of a nail to seal the head from water and air to prevent it from rusting when the nail is driven into an object.

2. Description of the prior Art

After nails are driven into objects, their head ends remain exposed to water, air, sunlight, and contaminates and therefore often rust. This is especially true when the nail heads and the objects into which they are driven are not painted or sealed such as with decks, fences, wooden swing sets, and other outdoor structures.

Another problem with conventional nails is that their heads are significantly wider than their shanks and therefore are easily visible once driven into an object. Many applications therefore require the use of finishing nails having small heads so that the prominence of the nail heads is minimized. However, finishing nails are hard to drive into objects because of their small heads and still suffer from the rusting problem mentioned in the previous paragraph. Finishing nails also have greatly diminished holding power, and under stress, often pull through the piece being held.

OBJECTS AND SUMMARY OF THE INVENTION

In view of the foregoing, it is an object of the present invention to provide a fastening assembly that does not rust after it has been driven into an object.

It is another object of the present invention to provide a fastening assembly that does not detract from the appearance of the object into which it is driven and that is easier to use and more effective than conventional finishing nails.

The present invention achieves these objects and other objects that become evident from the following description of the preferred embodiments of the invention by providing a fastening assembly that is weatherproof and that does not detract from the appearance of the object into which it is driven. The fastening assembly of the present invention broadly includes a fastening device such as a nail that includes an elongated shank and a head on one end of the shank, and a cover formed of water-tight material that can be positioned over the head of the fastening device for sealing the head from water, air, sunlight, and other contaminates. This prevents the head from rusting when the fastening device is driven into an object. The cover, which is preferably manufactured of synthetic resin materials, can be colored the same color as the object into which it is driven so that it blends in with the object and does not detract from the appearance of the object. The cover also permits nails having larger diameter heads to be substituted for weaker finishing nails.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
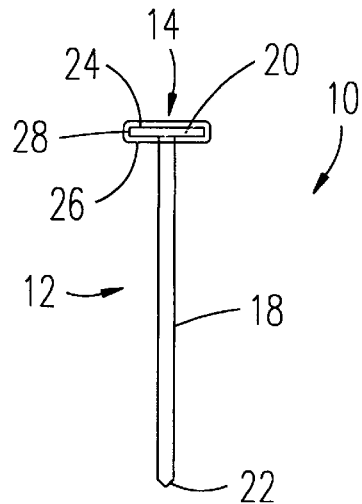
FIG. 1 is an elevational view of a fastening assembly constructed in accordance with a preferred embodiment of the present invention.

The drawing figures illustrate a fastening assembly 10 constructed in accordance with a preferred embodiment of the invention. As best illustrated in FIGS. 1 and 2, the fastening assembly is configured to be driven into an object such as a wall or board 16 and broadly includes a fastening device 12 and a cover 14.

In more detail, the fastening device 12 is preferably a conventional metal nail that includes an elongated shank 18 and a circular head 20 on one end of the shank. The end of the shank opposite the head may terminate in a point 22 to facilitate driving of the fastening device into the wall or board 16.

Figure 2:
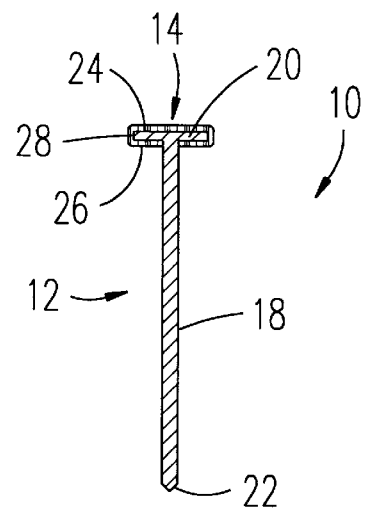
FIG. 2 is a vertical section view of the fastening assembly.
Figure 3:
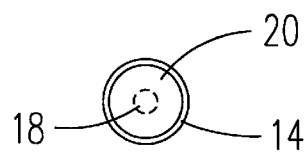
FIG. 3 is a top view of the fastening assembly with hidden parts shown in phantom lines.
Figure 4:
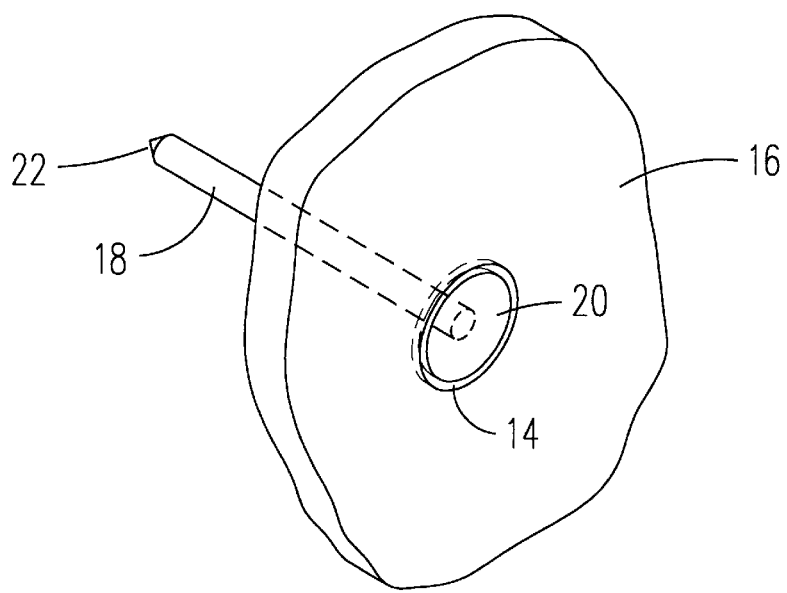
FIG. 4 is a perspective view of the fastening assembly shown driven into an object such as a wall or a board with hidden parts shown in phantom lines.

The cover 14 is formed of water-tight material such as synthetic resin, rubber, or other suitable material and includes a circular top wall 24, a circular bottom wall 26 spaced from the top wall, and an annular side wall 28 interconnecting the top and bottom walls and defining a hollow head-receiving chamber therebetween as best illustrated in FIG. 2. The bottom wall has a hole formed therein for permitting extension of the shank 18.

The cover 14 may be positioned over the head 20 of the fastening device 12 during manufacture in a shrink-wrap or similar procedure. Alternately, the cover may be separately formed so that it can be slipped over the head of the fastening device immediately before it is driven into the wall or board.

Once positioned over the head of the fastening device, the hole in the bottom wall 26 snugly engages the circumference of the shank of the fastening device so that the cover completely seals the head from water, air, sunlight, and contaminates. This prevents the fastening device from rusting when driven into the wall or board 16.

The cover 14 can be colored the same color as the object into which it is driven so that it blends with the object and does not detract the appearance of the object. This permits the fastening assembly 10 of the present invention to be used for applications requiring a finished look instead of weaker finishing nails having small diameter heads.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A weatherproof fastening assembly comprising:
   a fastening device including an elongated shank and a head on one end of the shank; and
   a cover formed of water-tight material positioned over the head of the fastening device for sealing the head from water and air to prevent the head from rusting when the fastening device is driven into an object, the cover including
   a circular top wall,
   a circular bottom wall spaced from the top wall, and an annular side wall interconnecting the top and bottom walls and defining a hollow head-receiving chamber therebetween, the bottom wall having a hole therein that can be slipped over the head of the fastening device so that the cover can be positioned over the head of the fastening device.

2. The fastening assembly as set forth in claim 1, the cover being formed of synthetic resin materials.

3. The fastening assembly as set forth in claim 1, the fastening device comprising a nail.

4. A cover for weatherproofing a fastening device having an elongated shank and a head on one end of the shank, the fastening device comprising:

a circular top wall;

a circular bottom wall spaced from the top wall; and an annular side wall interconnecting the top and bottom walls and defining a hollow head-receiving chamber therebetween, the bottom wall having a hole therein that can be slipped over the head of the fastening device so that the cover can be positioned over the head to seal the head and thus prevent the head from rusting when the fastening device is driven into an object.

5. The cover as set forth in claim 4, the top wall, bottom wall, and side wall being integrally formed of synthetic resin materials.

6. The cover as set forth in claim 5, the fastening device comprising a nail.

* * * * *